March 4, 1969     E. M. DEUTSCH     3,430,361

KIT CONSTRUCTION

Filed Jan. 17, 1966

INVENTOR.

Ernest M. Deutsch

United States Patent Office 3,430,361
Patented Mar. 4, 1969

3,430,361
KIT CONSTRUCTION
Ernest M. Deutsch, 245 E. 24th St.,
New York, N.Y. 10010
Filed Jan. 17, 1966, Ser. No. 521,042
U.S. Cl. 35—19                    6 Claims
Int. Cl. G09b 23/18

ABSTRACT OF THE DISCLOSURE

This invention is concerned with a kit construction which provides for a visual presentation of the manner of construction and includes a pre-wired circuit on an electrical chassis, and a replica chassis which provides a pictorial representation of the completed electrical chassis and carries electrical components which are to be transferred to the electrical chassis so that upon completion, the completed circuit on the electrical chassis matches the pictorial represntation on the replica chassis.

---

This invention relates to kit construction, and more particularly to electronic kit construction.

Present day kits, and more particularly electronic kits are generally quite complex for persons of ordinary average skill and even for those who have a facility with mechanical, electrical and electronic techniques. It is evident that the electrical and mechanical details of even the simplest electronic equipment are bewildering to persons without electrical and mechanical experience.

It is the purpose and intended goal of present day electronic kits to provide assembly information and instructions which are understandable to those without any or with a minimum of experience. In order to accomplish this, most kit manufacturers devote constant conscientious and intelligent attention to developing and creating the simplest, and least ambiguous type of presentation and instruction. However, even with the simple kits, as well as with the most complex type of kits, it is still necessary to use the language of words to describe the various elements of the kit to guide the constructor through the maze of wiring required, appropriate placement of components and the various mechanical operations required. In most instances the words which are used are generally related to the technology of the ultimate device or apparatus to be constructed from the kit, and are therefore generally unavoidable and mysterious to the constructor.

Some kits today find applicability in areas of teaching and education. The theory of kit construction is also applicable to industrial assembly operations, military maintenance and repair, and toys.

As is well understood, an electronic kit generally is comprised of a multiplicity of different components such as resistors, condensers, inductors, electronic tubes and/or transistor elements, as well as screws, nuts, bolts, washers and other elements forming the completed kit. Moreover, the aforesaid components are not all the same, and an electronic kit may usually contain resistors of different resistance values, condensers of different capacitative values, inductors of different inductive values, etc. It will be evident that as the equipment or device to be constructed becomes larger and/or more complex, it is necessary to provide a more varied number and type of components, and these components must be packaged and catalogued in order of their logical sequence in the assembly operation. Moreover, a separate set of detailed written instructions is provided together with the multiplicity of components, and the instructions themselves are often difficult to comprehend. It is therefore not surprising nor unusual that some of the so-called simple type of kits are often a formidable challenge to even some experienced technicians.

It is important to appreciate that even with the most modern and advanced type of kits the use of detailed instructions is a prime factor in rendering some of the kits difficult to complete. Accordingly, even with the most simplified type of presentation, such presentation is limited by the voluminous words and language which must be used for the assembly instructions.

Furthermore, kit construction requires that the components be fixed in place and/or interconnected mechanically and electrically. With conventional kit procedure and construction, it is necessary that a standard soldering operation be used. This requires a knowledge on the part of the assembler, a knowledge of soldering techniques which is often difficult to acquire. Moreover, present soldering techniques require some mechanical skills and a definite observation of precautions. Even with a soldering gun in the hands of the most experienced assembler or technician, it is not uncommon to damage the components as a result of the heat from the soldering gun. It is also well known that a poor soldering technique reduces the efficiency of the operation of the completed equipment. More and more electronic equipment is being transistorized, and more and more electronic kits today contain transistorized circuits, and such transistorized circuits are even more susceptible to damage from the heat of a soldering gun than conventional circuits.

It is therefore a primary object of the invention to provide an electronic kit construction which overcomes the aforesaid problems by providing an electronic kit construction having a visual presentation of the manner of construction.

Another object of the invention is the provision of an electronic kit construction which has a substantially reduced number of words and language instruction provided with the kit.

A further object of the invention is the provision of an electronic kit construction which substantially eliminates written construction information and a catalogue of components.

Yet another object of the invention is the provision of an electronic kit construction having a heatless soldering or heatless component connection technique.

Yet a further object of the invention is the provision of an electronic kit construction which is less sophisticated and complex and eliminates the problems of heat connection of the components and the location of the appropriate component from a printer's type of box containing the components.

With the present invention, information for the assembly of the kit is presented in a novel and simplified manner. The technique of assembly in accordance with the invention eliminates the detailed and complex assembly information together with the catalogue of components usually required in present day conventional electronic kits. Moreover, in carrying out the invention consonant with simplification of the construction, a conductive epoxy solder may be used to fix the various components in place in their appropriate place and in position in circuit with the other components. The conductive epoxy solder provides an electrical contact which is equivalent to or better than conventional metallic soldering techniques, and after appropriate curing, the conductive epoxy solder hardens to provide a mechanical bond which is much stronger than the bond provided with conventional soldering techniques.

Other and further objects will become apparent from the following description taken in conjunction with the accompanying drawing, in which like reference numerals refer to corresponding parts throughout, wherein.

Figure 1:
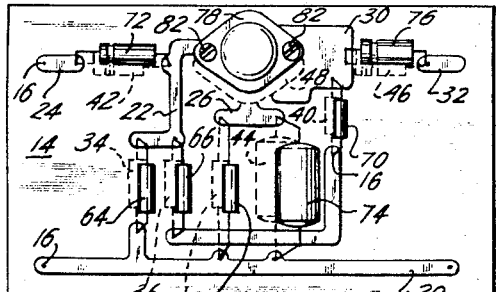
FIG. 1 is a schematic plan view of a mock or paper chassis containing the electrical components which are to be used in the kit construction.
Figure 2:
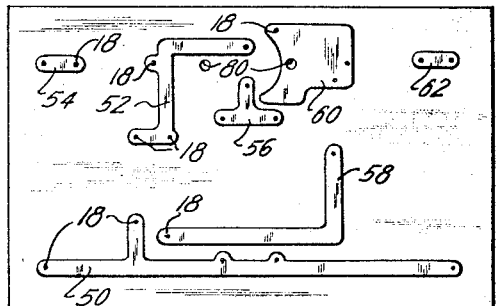
FIG. 2 is a schematic plan view of an electrical chassis for a kit construction containing those portions of the electrical circuit which is pre-wired and arranged to accept the components shown in FIG. 1 and forming together with the paper chassis of FIG. 1 the kit.

Referring now more particularly to FIGS. 1 and 2 of the drawing, an electronic kit construction according to the invention comprises a paper or replica chassis 10 with electrical components thereon in an unassembled condition of said kit construction, an electrical chassis 12 and a solderless, electrical or heatless connection material together with a short description (not shown) listing the parts contained in the kit construction and a short explanation to which reference will be made hereinafter.

Paper chassis 10 includes a pictorial representation 14 thereon of the manner in which the completed electrical kit construction will appear after the constructor has completed the construction together with electrical components to be transferred to the electrical chassis 12, as will be described further hereinafter.

Figure 3:
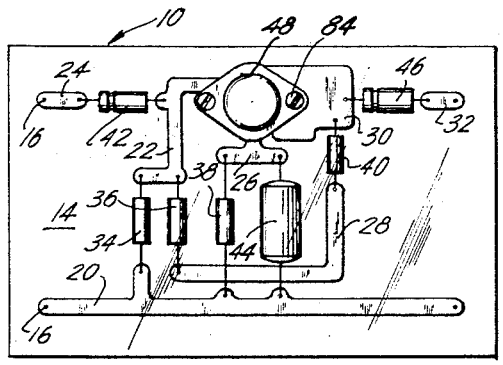
FIG. 3 is a plan view of the paper chassis of FIG. 1 after the electrical components have been removed therefrom.

Referring now more particularly to FIG. 3, the pictorial representation 14 illustrates an exact representation of the manner in which the electrical circuit appears after the kit construction has been completed with holes 16 being provided to represent the interconnection of the various electrical elements. The pictorial representation includes a representation of pre-wired circuit portions 20, 22, 24, 26, 28, 30, 32 and a representation of those circuit portions or components, such as resistors 34, 36, 38 and 40, condensers 42, 44 and 46 and transistor 48 which are to be removed from the paper chassis 10 and transferred to the electrical chassis 12.

In FIG. 2, electrical chassis 12, which forms part of the electrical kit construction, includes pre-wire circuitry including circuit portions 50, 52, 54, 56, 58, 60 and 62. Each of the aforesaid pre-wired circuit portions have one or more openings 18 which correspond to the openings 16 in the paper chassis 14. The openings 18 extend through the electrical chassis 12. The pre-wired circuit may be formed as a conventional printed circuit or any other suitable conventional pre-wired circuit. Also provided in the chassis 12 are a second group of openings suc has 80 for mechanical connections to the electrical chassis 12.

Figure 4:
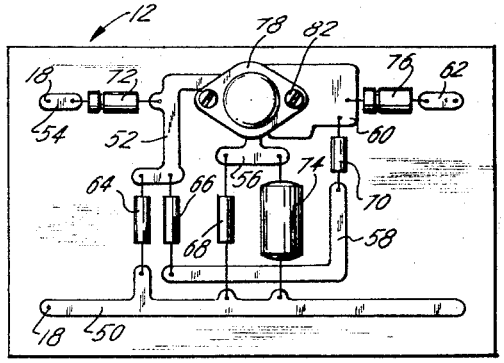
FIG. 4 is a plan view of the electrical chassis of FIG. 2 with the electrical components, removed from the paper chassis of FIG. 1, connected in the pre-wired circuit of the electrical chassis of FIG. 2 showing a completed kit; and, FIG. 5 represents a typical electronic circuit which is embodied in the completed electronic kit of FIG. 4.

Referring now more particularly to FIG. 4, it is to be noted that the electrical chassis 12 is shown in its completed condition with all components connected in position and includes openings 18 which correspond to holes or openings 16 in the paper chassis 10. The completed electrical circuit, matches or duplicates the pictorial representation thereof depicted in FIG. 3, as shown in FIG. 4 includes: the pre-wired circuit portions 50, 52, 54, 56, 58, 60 and 62 which are pictorially represented in FIG. 3 by 20, 22, 24, 26, 28, 30 and 32, respectively; resistors 64, 66, 68 and 70 which are pictorially represented in FIG. 3 by 34, 36, 38 and 40, respectively; condensers 72, 74 and 76 which are pictorially represented in FIG. 3 by 42, 44 and 46, respectively; and, a transistor 78 pictorially represented in FIG. 3 by 48.

Referring again to FIG. 1 of the drawings, the paper chassis 10, in addition to the pictorial representation of the completed electrical circuit, carries those electrical components, i.e., resistors 64 to 70, condensers 72 to 76 and transistor 78 which are to be transferred to the electrical chassis 12, as shown in FIG. 2 to form the completed electrical circuit shown in FIG. 4. Each of the electrical components is held by its leads on the paper chassis 10 and pass through the holes or openings 16 provided for this purpose. Transistor 78 is provided with mechanical components, such as two screws 82 for mechanically coupling the transistor 78 to chassis 12 through openings 80. In FIG. 3, the pictorial representation of the screws 82 is designated 84. Beneath each of the electrical components shown in FIG. 1 is an exact replica in pictorial form of the electrical component above it together with a representation of the leads going to the openings 16 from which the leads of the actual electrical components were removed. Upon removal of all of the electrical components from the paper chassis 10, there will remain a pictorial representation of the manner in which the completed kit construction should appear, and said last-mentioned pictorial representation is shown in FIG. 3.

Figure 5:
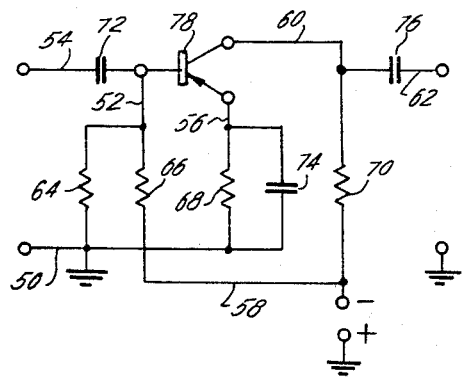

With a kit construction according to the invention, it is possible to construct the simplified electronic device shown in FIG. 5. Such kit construction has been shown as a simplified electronic device merely for purposes of explanation, it being understood that the principles of the invention as well as the method which will be described hereinafter are applicable to complex circutiry and electronic devices so that the kit constructor with little mechanical and electrical construction experience can build complex electronic devices by following the same simplified and short instructions as is supplied for the simplified electronic device of FIG. 5.

Referring now to the novel method of kit construction, the kit construction includes: a list of the component elements as mentioned hereinbefore, not for purpose of providing detailed instructions for the kit constructor, but for the purposes of enabling the kit constructor to replace any electrical component which may deteriorate after years of usage; a paper chassis 10 with the component elements thereon; an electrical chassis 12 with appropriate pre-wired circuitry and holes or openings in such pre-wired circuitry; a sufficient supply of a conductive epoxy resin and a suitable applicator therefor; and a short list of instructions as will be explained further hereinafter.

While the present invention is effective to eliminate the detailed instructions required with present day kit constructions, some recognition and intelligence is still required. Nevertheless, the kit construction according to the invention can be carried out by a person who cannot read provided certain simple instructions are communicated to the kit constructor.

The short list of instructions which is to be given to the kit constructor would include a statement that the circuit elements together with their leads are to be removed from the paper chassis 10 and transferred to the electrical chassis 12 with the leads to be placed into holes in the chassis 12 so that the electrical component is positioned on the electrical chassis 12 to correspond with the pictorial representation appearing on the paper chassis after removal. To facilitate matters, a second or separate pictorial representation of the completed kit may be provided, if this is considered desirable. The instructions will also include a statement informing the kit constructor to place the conductive epoxy resin solder on the leads after insertion into the chassis 12 to connect the leads thereto. This epoxy solder may be supplied together with a hypodermic type of syringe applicator or separately, thereby requiring a hypodermic syringe which is supplied to be filled periodically with the resin. The hypodermic syringe being effective to supply a metered quantity of the aforesaid epoxy resin to connect the lead of the electrical component to the pre-wired or printed circuit on the electrical chassis 12. This is helpful to control the amount of epoxy resin used for each lead without effort on the part of the kit constructor. A further statement could be added to the list of instructions, if thought desirable, to the effect that the completed kit construction should be a reproduction of the pictorial representation which remains on the paper chassis after all the components are removed, or reference may be made to the separate or second pictorial representation which may be conveniently supplied with the kit construction.

While I have described above the principles of my invention in connection with a specific electronic circuit, it is to be understood that this description is made only by way of example and not by way of limitation of the invention, and it will be apparent to those skilled in the art that various modifications may be made without departing from the scope of the invention as set forth in the appended claims.

What I claim is:

1. In a kit construction for constructing an electrical circuit with the instructions for such construction being substantially a pictorial representation of the completed circuit, a chassis for said electrical circuit, pre-wired circuitry on said chassis, said pre-wired circuitry having openings extending through said chassis, electrical components having leads adapted to be received within the openings in said chassis for connection with said pre-wired circuitry, a replica chassis having a pictorial representation of the electrical circuit to be completed from the kit construction, said replica chassis having openings extending through said pictorial representation thereon, the leads of said electrical components passing through said openings holding each of said electrical components individually onto said replica chassis above an exact replica of the respective component, so that the replica chassis prior to construction provides a representation of the completed electrical circuit with the actual components in place and subsequent to completion of construction the replica chassis is said pictroial representation of said completed circuit, and means connecting said electrical components to said pre-wired circuitry so that upon connection and completion, the completed electrical circuit matches said pictorial representation.

2. In a kit construction as claimed in claim 1, mechanical components on said replica chassis, said electric circuit chassis having other openings extending therethrough for mechanical connection thereto of said mechanical components on said replica chassis.

3. In a kit construction as claimed in claim 1, the method of constructing said electrical circuit comprising the steps of removing the leads together with the electrical component coupled thereto from a replica chassis having a pictorial representation thereon of said electrical circuit thereon, removal of said electrical component from said replica chassis exposing a pictorial representation of an exact replica on said replica chassis of the removed electrical component, placing the leads of said removed electronic component in appropriate holes on an electrical chassis having a pre-wired electrical circuitry thereon to have said electrical component occupy on said electrical chassis as it occupied on said replica chassis, heatless soldering the leads of said electrical component to said electrical chassis, and repeating the aforesaid steps for each remaining component on said replica chassis until all of the components are transferred to said electrical chassis.

4. In a kit construction as claimed in claim 3, including the steps of mechanically connecting the mechanical elements to said electrical chassis in mechanical connection portions provided on said electrical chassis.

5. In a kit construction as claimed in claim 3, said heatless soldering including the steps of supplying a metered quantity of a conductive epoxy solder from a syringe to the leads of said electrical components to provide an electrical connection between said electrical components and said pre-wired circuitry on said electrical chassis.

6. In a kit construction as claimed in claim 5, including the steps of sequentially removing all of the removable components from the replica chassis and transferring them to the electrical chassis, and sequentially electrically and mechanically connecting the components with the epoxy solder and mechanical connectors carried by said components, respectively, with the electrical chassis to provide an exact replica on the electrical chassis of the pictorial representation appearing on the replica chassis after removal of all of the removable components supplied with the replica chassis.

References Cited

UNITED STATES PATENTS

| | | | |
|---|---|---|---|
| 3,011,269 | 12/1961 | Thompson | 35—19 |
| 2,917,834 | 12/1959 | Butler et al. | 35—8 |
| 3,013,188 | 12/1961 | Kohler. | |

OTHER REFERENCES

Kiefer et al.: Assembly Workers Get the Picture, article in August 1961 issue of Supervision magazine, pp. 4–5 relied on.

EUGENE R. CAPOZIO, *Primary Examiner.*

HARLAND S. SKOGQUIST, *Assistant Examiner.*

U.S. Cl. X.R.

35—8